Figure 1:
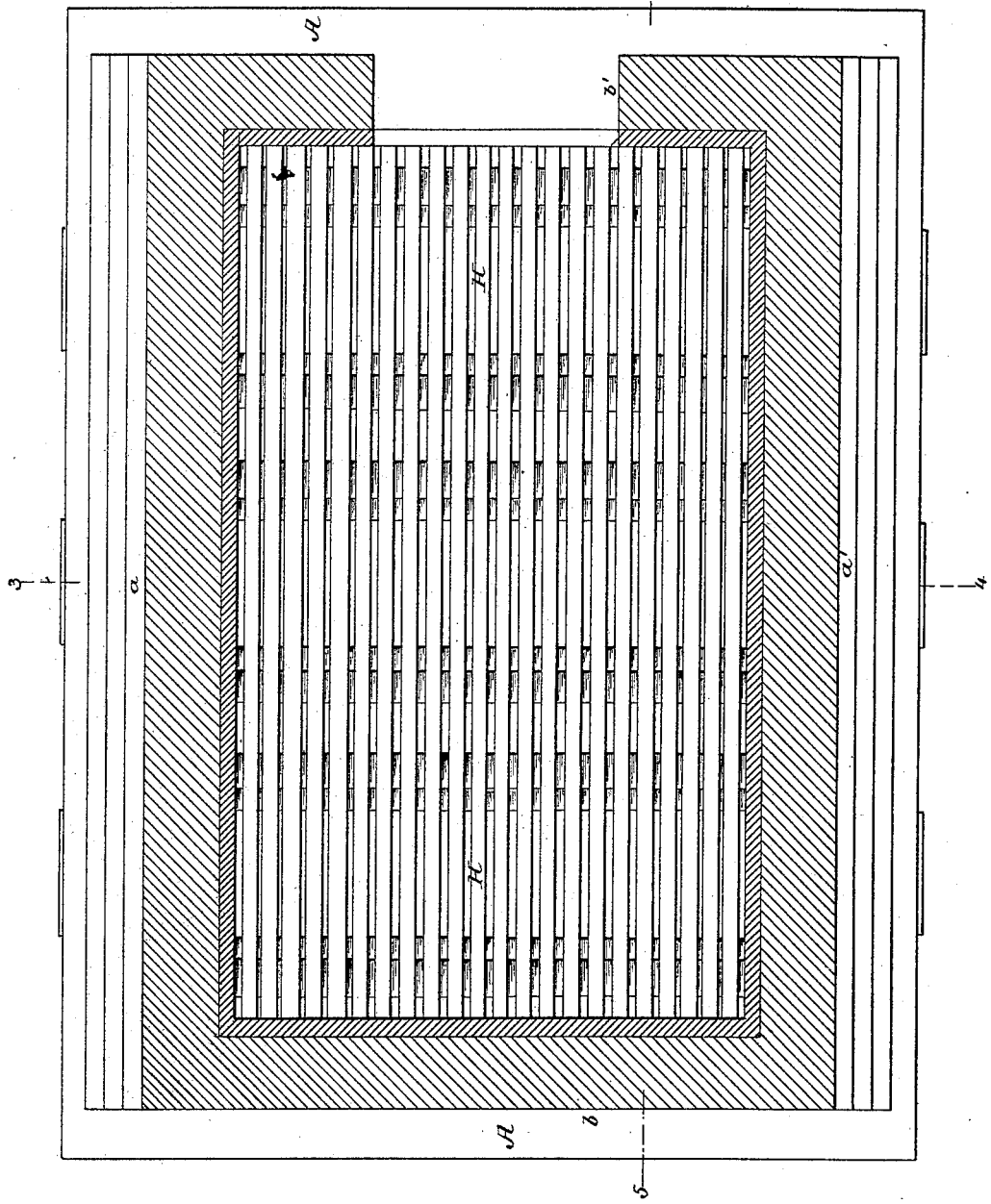

(No Model.) 2 Sheets—Sheet 1.

W. H. MELCHER.
KILN FOR BRICKS, LIME, POTTERY, &c.

No. 339,001. Patented Mar. 30, 1886.

Witnesses:
John E. Parker
William F. Davis

Inventor.
William H. Melcher
by his Attorneys
Howson and Son

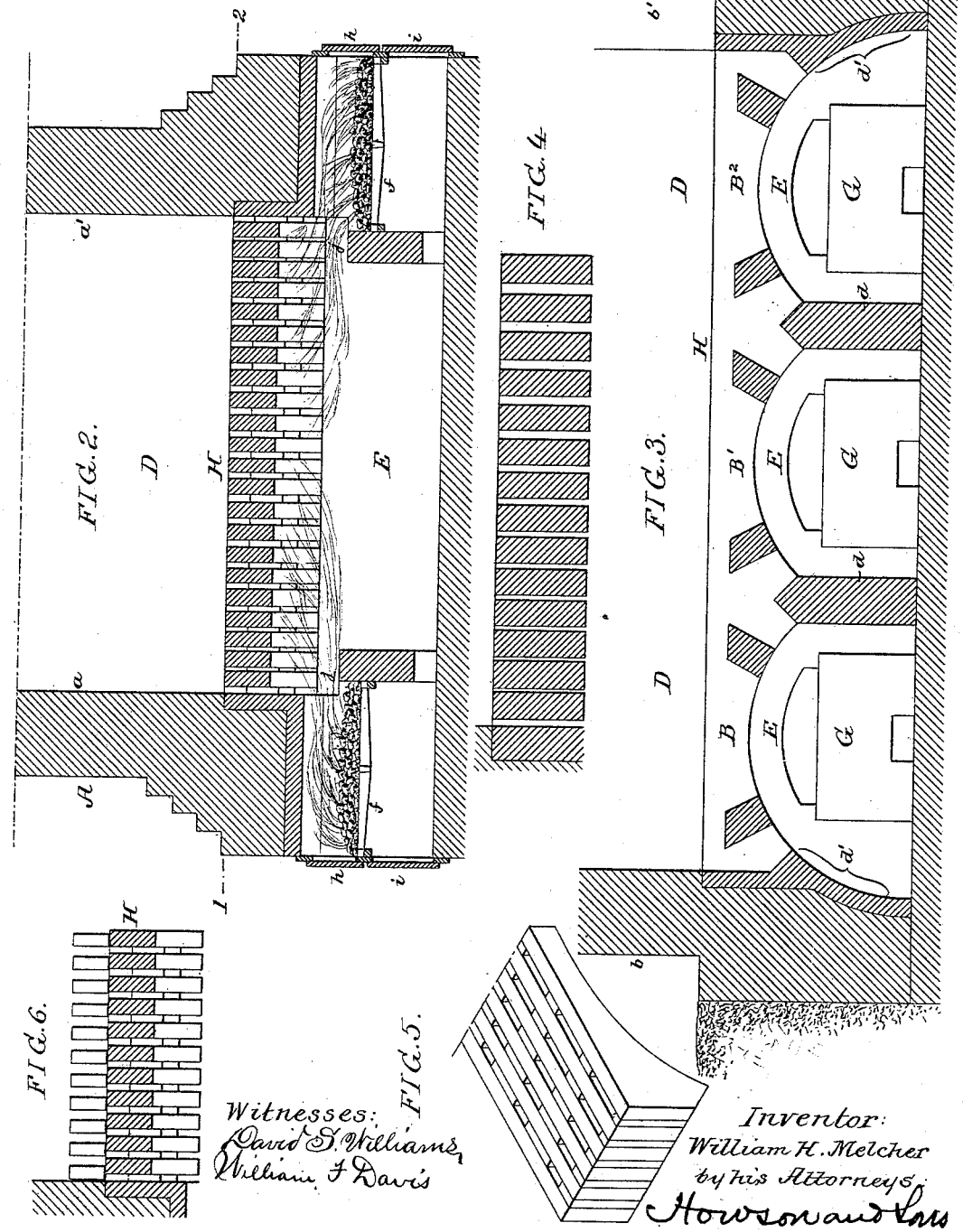

UNITED STATES PATENT OFFICE.

WILLIAM H. MELCHER, OF PHILADELPHIA, PENNSYLVANIA.

KILN FOR BRICKS, LIME, POTTERY, &c.

SPECIFICATION forming part of Letters Patent No. 339,001, dated March 30, 1886.

Application filed December 26, 1885. Serial No. 186,791. (No model.)

*To all whom it may concern:*

Be it known that I, WILLIAM H. MELCHER, a citizen of the United States, residing in Philadelphia, Pennsylvania, have invented certain Improvements in Kilns for Bricks, Lime, Pottery, or other Clay Products, of which the following is a specification.

My invention consists of certain improvements in the construction of the perforated floor of the kiln shown in the patent granted to me February 12, 1884, No. 293,489.

In the accompanying drawings, Figure 1 is a sectional plan view of my improved kiln on the line 1 2, Fig. 2; Fig. 2, a transverse sectional view on the line 3 4, Fig. 1; Fig. 3, a longitudinal sectional view on the line 5 6, Fig. 1; Fig. 4, an enlarged cross-section of part of the floor of the kiln, showing the main feature of my invention more clearly than Fig. 2; and Figs. 5 and 6, views of modifications of my invention.

The kiln A is preferably of quadrangular shape, as shown in Fig. 1, $a$ $a'$ being the opposite side walls, and $b$ $b'$ the opposite end walls. In the present instance the structure is separated by a series of brick arches into two main chambers or compartments—namely, the upper or burning chamber, D, and the lower compartment or combustion-chamber, E. There are in the present instance three sets of brick arches, B B' B², supported by the center walls, $d$ $d$, and the opposite abutments, $d'$ $d'$, the latter being on the same radius as and in effect a continuation of the two end arches, B B². As in my former patent, the arches of each set are arranged a short distance apart, the openings between the arches of each set affording direct communications between the burning-chamber and combustion-chamber beneath, thus forming a perforated floor, H, for supporting the bricks to be burned.

When the structure is of quadrangular form, as shown in the drawings, I prefer to combine with its six fire-places, G—three under each side wall. The furnaces are of the ordinary construction, each having a grate, $f$, fuel-door $h$, and an ash-pit door, $i$, and each furnace communicates with the combustion-chamber E through the passage $j$, as shown more clearly in Fig. 2.

In the kiln shown in my former patent, the openings in the floor were all of the same size, and consequently the volume of the products of combustion passing into the burning-chamber D from the combustion-chamber E was greater at points near the furnaces than at points more remote therefrom; hence the bricks nearest the furnaces were more quickly and thoroughly burned than those nearer the center of the furnace, some difficulty being thus experienced in burning the mass of bricks to a uniform condition. This difficulty I have overcome by graduating the size of the openings in the floor of the kiln. Thus, as will be seen in Fig. 2, and in the enlarged diagram, Fig. 4, the openings are narrowest near the opposite sides of the kiln and gradually increase in width until the maximum width is reached at the center of the kiln.

I have shown the first opening on each side a trifle wider than the next opening, as the tendency of the products of combustion is to pass by this first opening. By thus graduating the size of the openings, I am enabled to effect a uniform distribution of the products of combustion and a consequent uniform action upon the contents of the kiln.

The openings between the arches need not be necessarily graduated in width, as said openings may be of uniform width, but graduated in length by the use of filling-pieces at intervals, as shown in Fig. 5, the same object being thereby attained.

In Fig. 6 I have shown a modification, in which the openings in the floor are of uniform length and width, the first course of bricks laid upon the floor being disposed in such a manner as to obstruct some of the openings more than others, so that the openings near the furnace will be nearly closed, while those at the middle of the floor are comparatively unobstructed.

Instead of bracing the kiln by erecting struts to support the weight of the floor, as shown in my former patent, I build the kiln so that the ground-line will be flush, or thereabout, with the floor H, and I thicken the foundation-wall below the ground-line and continue the abutments $d'$ on the same radius as the end arches, thus making a very strong structure, and one well calculated to resist the tendency which the heavy weight of the stacked bricks has to thrust the walls outward.

I claim as my invention—

1. A kiln in which the following elements are combined, namely: first, a chamber for containing the bricks or other articles to be burned; second, a combustion-chamber beneath the said burning-chamber; third, fire-places communicating with said combustion-chamber; and, fourth, a floor for supporting the articles to be burned, said floor having openings graduated in area in accordance with their relation to the fire-places, all substantially as described.

2. A kiln in which the following elements are combined, namely: first, a chamber for containing the bricks or other articles to be burned; second, a combustion-chamber beneath the said burning-chamber; third, furnaces G, communicating with the combustion-chamber; and, fourth, a floor composed of arches separated by spaces which vary in area in accordance with their relation to the fire-places, all substantially as specified.

3. In a kiln, the combination of the end walls, $b\ b'$, portions of which are below the level of the ground, the combustion-chamber E, the burning-chamber D, the arched floor H, for supporting the bricks or other articles to be burned, and abutments $d'$, built in the end walls, $b\ b'$, and having the same or substantially the same radius as the end arches, all substantially as and for the purpose described.

In testimony whereof I have signed my name to this specification in the presence of two subscribing witnesses.

WILLIAM H. MELCHER.

Witnesses:
WILLIAM F. DAVIS,
HARRY SMITH.